(12) United States Patent
Grabarnik et al.

(10) Patent No.: US 7,996,342 B2
(45) Date of Patent: Aug. 9, 2011

(54) SYSTEMS, METHODS AND COMPUTER PROGRAM PRODUCTS FOR SUPERVISED DIMENSIONALITY REDUCTION WITH MIXED-TYPE FEATURES AND LABELS

(75) Inventors: Genady Grabarnik, Scarsdale, NY (US); Irina Rish, Rye Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 12/031,775

(22) Filed: Feb. 15, 2008

(65) Prior Publication Data

US 2009/0210363 A1    Aug. 20, 2009

(51) Int. Cl.
*G06F 15/18* (2006.01)
(52) U.S. Cl. .......................................................... 706/12
(58) Field of Classification Search ...................... 706/12
See application file for complete search history.

(56) References Cited

OTHER PUBLICATIONS

Random Subspace Method in Text Categorization, Gangeh, M.J.; Kamel, M.S.; Duin, R.P.W.; Pattern Recognition (ICPR), 2010 20th International Conference on Digital Object Identifier: 10.1109/IICPR.2010.505 Publication Year: 2010 , pp. 2049-2052.*
Distance metric learning, with application to clustering with side-information, [online]; [retrieved on Jan. 14, 2008]; retrieved from the Internet http://ai.stanford.edu/~ang/papers/nipso2-metric.pdf.
Distance Metric Learning for Large Margin Nearest Neighbor Classification, [online[; [retrieved on Jan. 14, 2008]; retrieved from the Internet http://books.nips.cc/papers/files/nips18/NIPS2005_0265.pdf.
Supervised dimensionality reduction using mixture models, [online]; [retrieved on Jan. 14, 2008]; retrieved from the Internet http://kodiak.ucsd.edu/alon/papers/spr_dmn_rdc.pdf.
The Support Vector Decomposition Machine, [online]; [retrieved on Jan. 14, 2008]; retrieved from the Internet http://www.icml2006.org/icml_documents/camera-ready/087_The_Support_Vector_D.pdf.
Metric Learning for Kernel Regression, [online]; [retrieved on Jan. 14, 2008]; retrieved from the Internet http://jmlr.csail.mit.edu/proceedings/papers/v2/weinberger07a/weinberger07a.pdf.

* cited by examiner

*Primary Examiner* — Michael Holmes
(74) *Attorney, Agent, or Firm* — Cantor Colburn LLP; Preston Young

(57) ABSTRACT

Systems, methods and computer program products for supervised dimensionality reduction. Exemplary embodiments include a method including receiving an input in the form of a data matrix X of size N×D, wherein N is a number of samples, D is a dimensionality, a vector Y of size N×1, hidden variables U of a number K, a data type of the matrix X and the vector Y, and a trade-off constant alpha; selecting loss functions in the form of Lx(X,UV) and Ly(Y,UW) appropriate for the type of data in the matrix X and the vector Y, where U, V and W are matrices, selecting corresponding sets of update rules RU, RV and RW for updating the matrices U,V and W, learning U, V and W that provide a minimum total loss L(U,V,W)=Lx(X,UV)+alpha*Ly(Y,UW), and returning matrices U, V and W.

2 Claims, 5 Drawing Sheets

YM denote the class labels for M prediction problems, and Ui denote hidden variables. State-of-art SDR approaches make different assumptions about the nature of relationship between the vector X and vector U, which defines dimensionality reduction part, and relationship between U and Y, which defines the prediction part.

SYSTEMS, METHODS AND COMPUTER PROGRAM PRODUCTS FOR SUPERVISED DIMENSIONALITY REDUCTION WITH MIXED-TYPE FEATURES AND LABELS

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to machine learning, and particularly to systems, methods and computer program products for supervised dimensionality reduction with mixed-type features and labels.

2. Description of Background

A common problem in many applications of statistical data analysis is to learn an accurate predictive model from very high-dimensional data. Examples include predicting network latency and/or bandwidth between two points based on observed latency and/or bandwidth between some other pairs of points; predicting end-to-end connectivity in a wireless or sensor network, and in general, predicting end-to-end performance of a transaction in a distributed system given some other measurements such as, for example, observed end-to-end performance of other transactions. Particularly, in systems management/autonomic computing applications that require self-healing capabilities there is a need for fast, online predictions from high-dimensional data volumes, e.g. for the purpose of selection best route in overlay networks and sensor networks, or selecting best server to download a file from in content-distribution systems. The problem here would be to predict quickly and accurately the latency or bandwidth for a particular end-to-end connection, given high-dimensional data recording previous end-to-end performance for a large number of end-to-end connections, such as previous file download history in the network, or previous connectivity.

There are multiple other examples of learning from very high-dimensional data, including but not limited to applications such as customer response prediction in online advertisement, predicting presence of a disease based on DNA microarray data, predicting person's emotional state based on her/his fMRI data, and so on. However, learning from very high-dimensional data presents several challenges including computational burden and overfitting the data. Also, one may be interested not only in learning a 'black-box' predictor from high-dimensional data, but also in identifying predictive structures in the data, i.e., building an interpretable predictive model.

A common approach to handling high-dimensional data is to use some dimensionality reduction technique before learning a predictor (classification or regression model), i.e. to transform the original high-dimensional data represented by an N×D matrix X (where N is the number of samples, and D is the number of input variables called features, i.e. the dimensionality of the input) into a low-dimensional space, where the coordinate axis in the low-dimensional space correspond to so-called hidden variables. Then a straightforward approach would be just to learn a predictor on top of the small-dimensional representation, given the labels Y (an N-dimensional vector in case of a single prediction problem, or an N×M matrix in case of solving M prediction problems simultaneously, i.e. having M class labels to predict). More sophisticated state-of-art approaches in this area, called supervised dimensionality reduction, tend to combine learning a predictor with learning a mapping to a low-dimensional space. Performing simultaneous dimensionality reduction and learning a predictor can lead to better results than performing those steps separately. This approach is usually referred to as supervised dimensionality reduction (SDR). FIG. 1 illustrates hidden-variable model 10 for SDR where Xi denote observed variables, Y1 . . . YM denote the class labels for M prediction problems, and Ui denote hidden variables. A hidden-variable model for SDR can be depicted graphically as shown in the FIG. 1, where Xi denote observed variables, Y1 . . . YM denote the class labels for M prediction problems, and Ui denote hidden variables. State-of-art SDR approaches make different assumptions about the nature of relationship between the vector X and vector U, which defines dimensionality reduction part, and relationship between U and Y, which defines the prediction part.

SUMMARY OF THE INVENTION

Exemplary embodiments include a method including receiving an input in the form of a data matrix X of size N×D, wherein N is a number of samples, D is a dimensionality, a vector Y of size N×1, hidden variables U of a number K, a data type of the matrix X and the vector Y, and a trade-off constant alpha, selecting loss functions in the form of Lx(X,UV) and Ly(Y,UW) appropriate for the type of data in the matrix X and the vector Y, where U, V and W are matrices, selecting corresponding sets of update rules RU, RV and RW for updating the matrices U,V and W, learning U, V and W that provide a minimum total loss L(U,V,W)=Lx(X,UV)+alpha*Ly(Y, UW), including defining a threshold epsilon, initializing the matrices U, V and W to random matrices, for epsilon less than or equal to L−L(U,V,W), iteratively performing fixing matrices V and W, updating matrix U via rules RU, wherein U=RU (U), fixing matrices U and W, updating matrix V via rules RV, wherein V=RV(V), fixing matrices U and V, updating matrix W via rules RW, wherein W=RW(W) and returning matrices U, V and W.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution, which provides systems and methods for supervised dimensionality reduction. Unlike state-of-art dimensionality reduction schemes (PCA, ICA etc), the systems and methods described herein perform supervised dimensionality reduction, compressing data into representation relevant to the predicted variable. The systems and methods described herein provide a flexible learning method for handling arbitrary combination of binary and continuous X (input) and Y (label) data. Efficient, provably-convergent alternating minimization framework based on using exact update formulas (closed-form update rules) rather than solving optimization sub-problems at each iteration, as done in state-of-art methods in the area.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

In exemplary embodiments, the systems and methods described herein include machine learning approaches and multiple applications including performance management in distributed systems, predicting customer's response to advertisement, and analysis of high-dimensional medical imaging data. In exemplary embodiments, the systems and methods described herein include supervised dimensionality reduction (SDR) algorithms that combine feature extraction via dimensionality reduction with learning a predictive model in a unified optimization framework. Feature extraction is performed by learning a generally nonlinear mapping (for example, corresponding to appropriate generalized linear models (GLMs) for feature and class) from the original feature space into a compact lower-dimensional representation, while simultaneously training a predictive model on this compact representation. In exemplary embodiments, the additive property of auxiliary functions is implemented to derive combined auxiliary functions that lead to provably convergent algorithms. The systems and methods described herein can be applied to several prediction problems, including: 1. end-to-end connectivity prediction in a wired (Internet) and wireless sensor networks; 2. predicting customer response to advertisement; and 3. functional magnetic resonance imaging (fMRI) data analysis.

In exemplary embodiments, the systems and methods described herein implement closed-form update rules instead of optimization, providing an efficient alternative to state-of-art dimensionality reduction methods such as SVDM. The systems and methods described herein provide accuracy, while reducing dimensionality from several hundred or thousands of variables to less than 10, and often competitive or even more accurate than state-of-art SVM classifier (on classification problems).

In exemplary embodiments, the data are given by N×D matrix X where n is the number of samples, d is the number of feature variables (i.e., dimensionality of the data), and M labels for each sample are given by the N×M matrix Y. In exemplary embodiments, supervised dimensionality relies on the assumption that there is some low-dimensional structure in the data that is predictive about the class, and the goal is to find such structure by "denoising" the data in a supervised way, i.e. by learning a predictor on a low-dimensional representation simultaneously with learning such a representation.

Figures 1, 2:
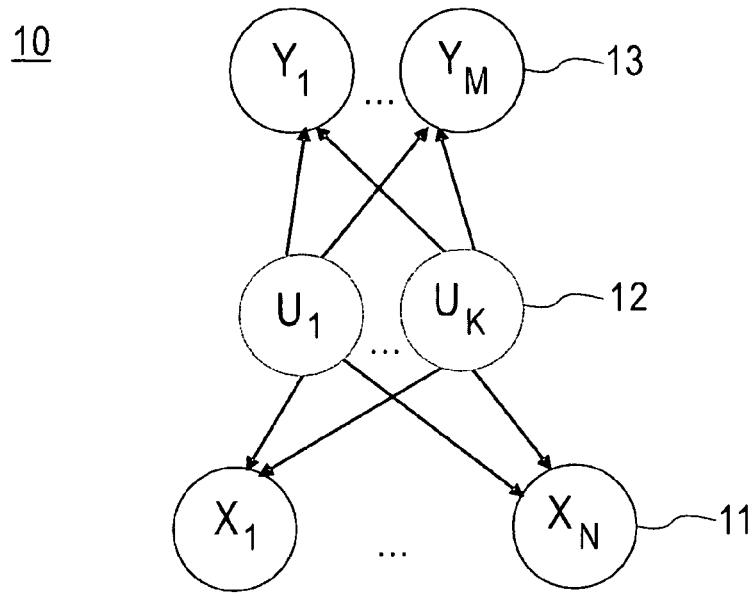
FIG. 1 illustrates hidden-variable model for SDR.
FIG. 2 illustrates a schematic representation of an approximation of X and Y matrices by generalized linear models (GLMs)

In exemplary embodiments, the hidden-variable model described in FIG. 1 takes a particular form that utilizes generalized linear models (GLMs) to handle different data types (such as binary and real-valued). A generalized linear model is given by the corresponding link function f, different for different assumptions about the data (e.g., Bernoulli assumption for binary data, Gaussian for real-valued data). Using GLMs over hidden variables U, approximations X'=f(UV) and Y'=g(UW) for X and Y are obtained, respectively, where f and g are appropriate link functions, U is an N×K matrix containing the values of K hidden variables (columns), for each sample (row), V is the K×D matrix of GLM parameters for X (corresponds to K basis vectors in D-dimensional space describing the feature space), and W is the K×M vector of GLM parameters for Y (corresponds to K basis vectors in M-dimensional space describing M labels). FIG. 2 illustrates a schematic representation 20 of an approximation of X and Y matrices by generalized linear models (GLMs). A generalized linear model is given by the corresponding link function f, different for different assumptions about the data (e.g., Bernoulli assumption for binary data, Gaussian for real-valued data). Using GLMs over hidden variables U, approximations X'=f(UV) and Y'=g(UW) for X and Y are obtained, respectively, where f and g are appropriate link functions, U is an N×K matrix containing the values of K hidden variables (columns), for each sample (row), V is the K×D matrix of GLM parameters for X (corresponds to K basis vectors in D-dimensional space describing the feature space), and W is the K×M vector of GLM parameters for Y (corresponds to K basis vectors in M-dimensional space describing M labels). In exemplary embodiments, the systems and methods described herein minimize the total loss function L(U,V,W)=L(X,UV)+ alpha L(Y, UW) where losses L(X,UV) and L(Y, UW) are uniquely defined by the respective GLM models and correspond to approximation errors of replacing X and Y by X' and Y', respectively; and alpha is a trade-off constant defining how much weight is assigned to prediction accuracy versus data approximation accuracy.

Figure 3:
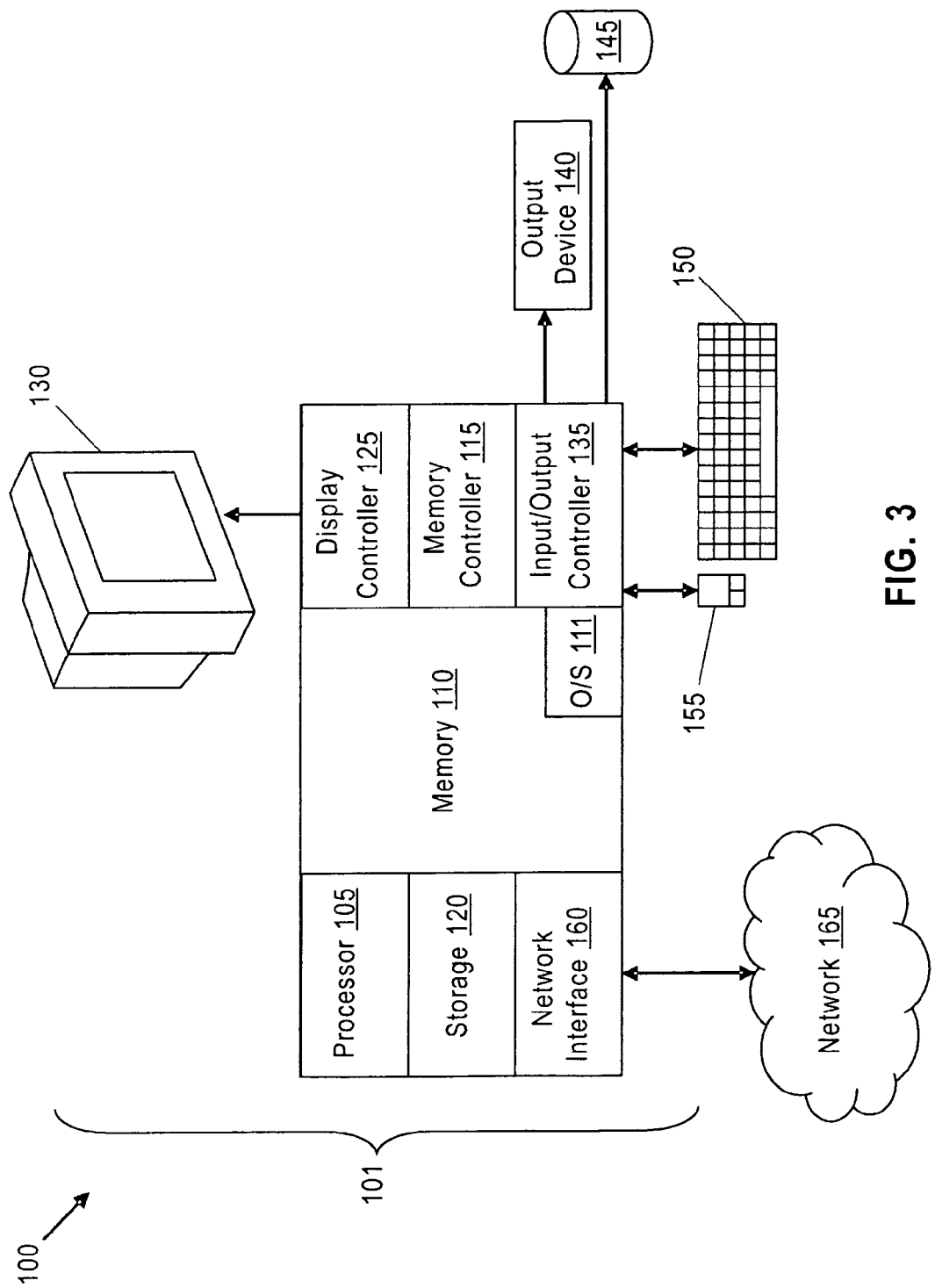
FIG. 3 illustrates a block diagram of a system for supervised dimensionality reduction with mixed-type features and labels in accordance with exemplary embodiments.

FIG. 3 illustrates a block diagram of a system 100 for supervised dimensionality reduction with mixed-type features and labels in accordance with exemplary embodiments. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 3, the computer 101 includes a processor 101, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 3, the software in the memory 110 includes the supervised dimensionality reduction methods described herein in accordance with exemplary embodiments and a suitable operating system (OS) 111. The operating system 111 essentially controls the execution of other computer programs, such as supervised dimensionality reduction systems and methods described herein, and provides scheduling, input-output control, file and data management, memory management, and communication control and related services.

The supervised dimensionality reduction methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the O/S 111. Furthermore, the supervised dimensionality reduction methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a NIC or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems.

In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The supervised dimensionality reduction methods described herein and the OS 111, in whole or in part, but typically the latter, are read by the processor 105, perhaps buffered within the processor 105, and then executed.

When the systems and methods described herein are implemented in software, as is shown in FIG. 3, it the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The supervised dimensionality reduction methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the supervised dimensionality reduction methods are implemented in hardware, the supervised dimensionality reduction methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 4:
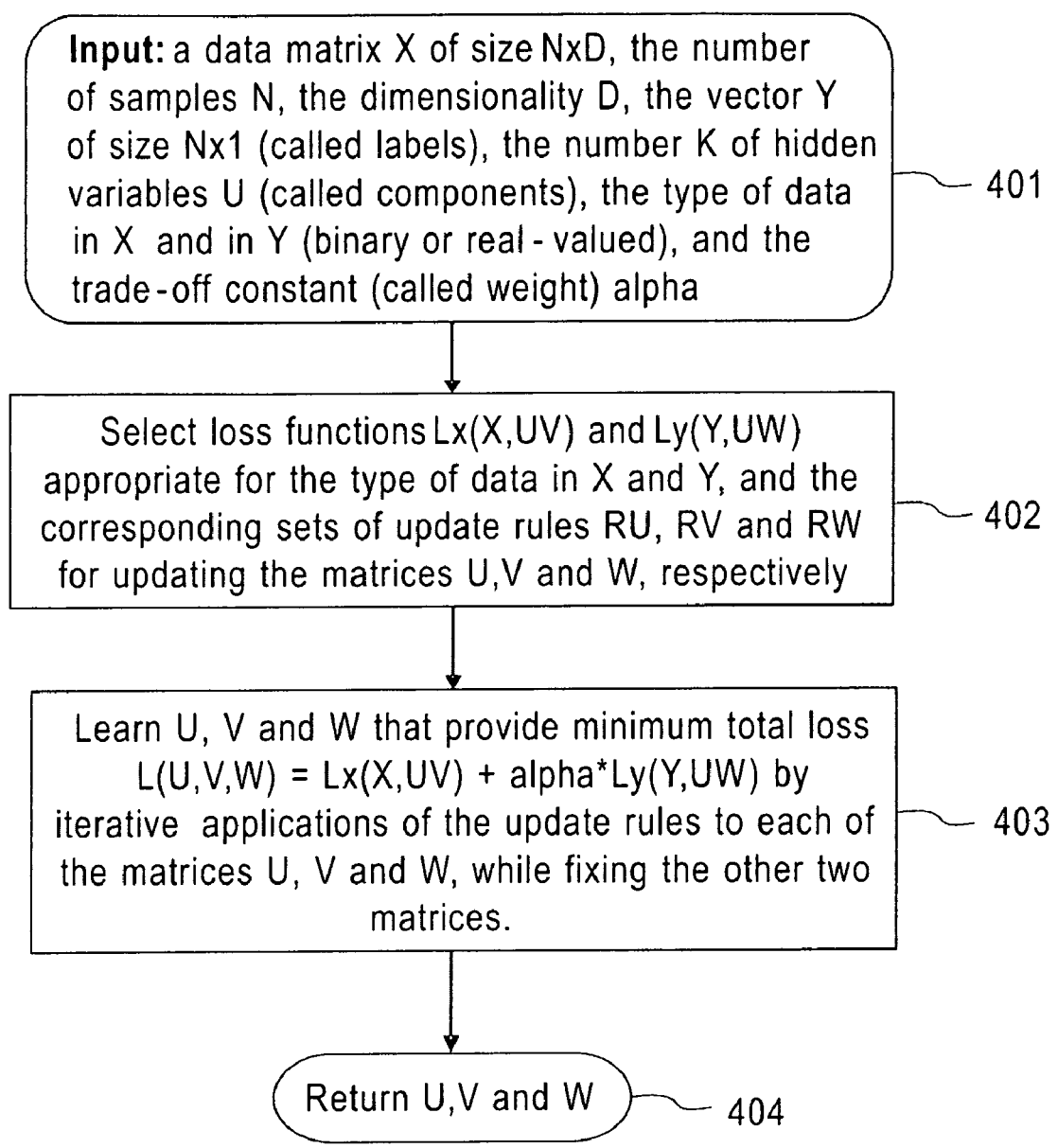
FIG. 4 illustrates an overall method of learning an SDR model.
Figure 5:
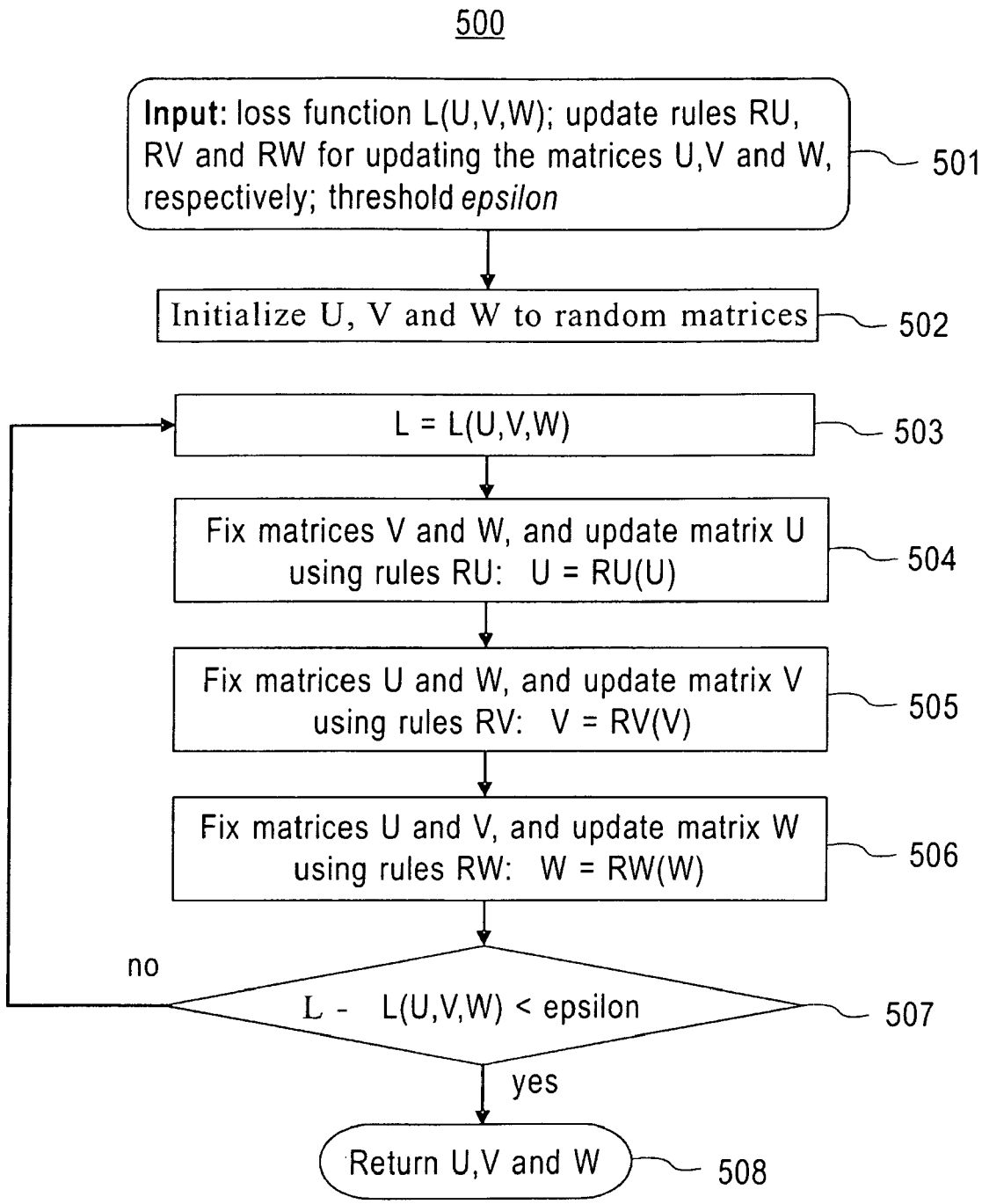
FIG. 5 is a flow diagram illustrating details of learning an SDR model.
Figure 6:
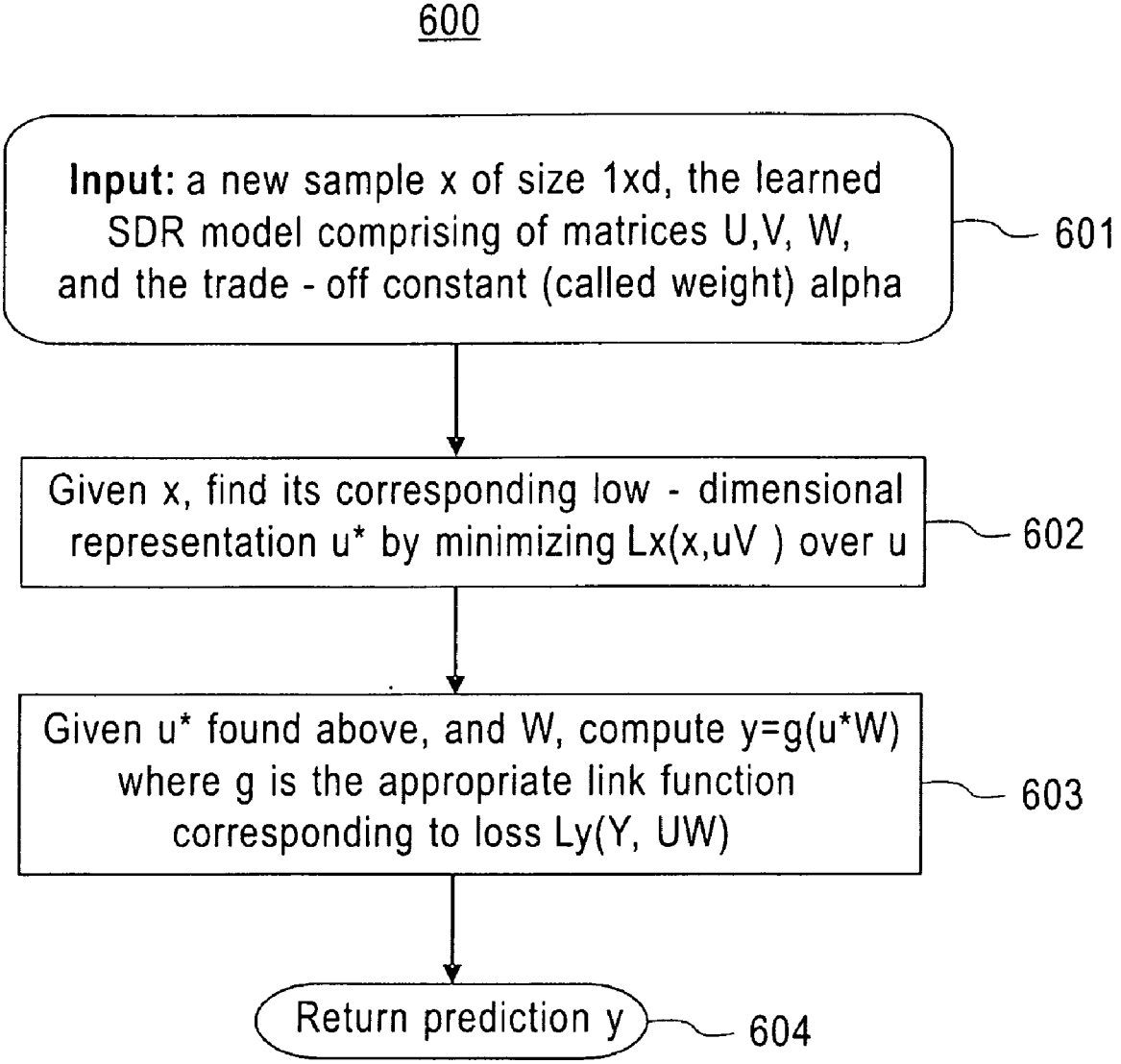
FIG. 6 illustrates a flow chart for a method implementing the learnt SDR model.

In exemplary embodiments, as described in FIGS. 4-6, the systems and methods described herein first learn an SDR model (as illustrated in FIGS. 4 and 5) and then applies the SDR model to predict labels of previously unseen samples (as illustrated in FIG. 6).

FIG. 4 illustrates an overall method 400 of learning an SDR model. At block 401, the input is a data matrix X of size N×D, the number of samples N, the dimensionality D, the vector Y of size N×1 (called labels), the number K of hidden variables U (called components), the type of data in X and in Y (binary or real-valued), and the trade-off constant (called weight) alpha. At block 402, the method 400 selects loss functions Lx(X,UV) and Ly(Y,UW) appropriate for the type of data in X and Y, and the corresponding sets of update rules RU, RV and RW for updating the matrices U,V and W, respectively. At block 403, the method 400 learns U, V and W that provide minimum total loss L(U,V,W)=Lx(X,UV)+alpha*Ly(Y,UW) by iterative applications of the update rules to each of the matrices U, V and W, while fixing the other two matrices. At block 404, the method 400 returns U, V and W.

FIG. 5 is a flow diagram illustrating details of learning an SDR model method 500 from block 403 of FIG. 4. At block 501, the input is a loss function L(U,V,W); update rules RU, RV and RW for updating the matrices U,V and W, respectively; threshold epsilon. The method 500 shows an iterative procedure for solving the alternating minimization problem of minimizing L(U,V,W). At each iteration, a set of update rules are applied to one of the matrices U, V and W, while holding the other two matrices fixed at blocks 504, 505, 506. The procedure iterates until convergence, where convergence criterion requires the difference between L(U,V,W) on two consecutive iterations not to exceed a given small threshold epsilon at block 507. At block 508, the method 500 returns U,V and W.

FIG. 6 illustrates a flow chart for a method 600 implementing the learnt SDR model (represented by three matrices U, V and W) to predict the label of a new instance x by first finding its corresponding low-dimensional representation u* using a GLM model learned for X, and then predicting the label y=g(u*W). At block 601, the input is a new sample x of size 1×d, the learned SDR model comprising of matrices U,V, W, and the trade-off constant (called weight) alpha. At block 602, the method 600, given x, finds its corresponding low-dimensional representation u* by minimizing Lx(x,uV) over u. At block 603, the method 600, given u* found at block 602, and W, computes y=g(u*W), where g is the appropriate link function corresponding to loss Ly(Y, UW). At block 604, the method 600 returns prediction y.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. In a computer system, a method for supervised dimensionality reduction for predicting data for at least one of end-to-end connectivity in a wired and wireless sensor network, customer response to advertisement, and functional magnetic resonance imaging (fMRI) data analysis, the method comprising:

receiving input data for at least one of the end-to-end connectivity in a wired and wireless sensor network, the customer response to advertisement, and the functional magnetic resonance imaging (fMRI) data analysis, the input data in the form of a data matrix X of size N×D, wherein N is a number of samples, D is a dimensionality, a vector Y of size N×1, hidden variables U of a number K, a data type of the matrix X and the vector Y, and a trade-off constant alpha;

selecting loss functions in the form of Lx(X,UV) and Ly(Y, UW) appropriate for the type of data in the matrix X and the vector Y, where U, V and W are matrices;

selecting corresponding sets of update rules RU, RV and RW for updating the matrices U,V and W;

learning U, V and W that provide a minimum total loss L(U,V,W)=Lx(X,UV)+alpha*Ly(Y,UW), including:
defining a threshold epsilon;
initializing the matrices U, V and W to random matrices;
for epsilon less than or equal to L-L(U,V,W), iteratively performing:
fixing matrices V and W;
updating matrix U via rules RU, wherein U=RU(U);
fixing matrices U and W;
updating matrix V via rules RV, wherein V=RV(V);
fixing matrices U and V;
updating matrix W via rules RW, wherein W=RW(W); and returning matrices U, V and W.

2. The method as claimed in claim 1 further comprising:
receiving a sample x of size 1×D, the matrices U, V and W, and the trade-off constant alpha;
computing a low-dimensional representation u*, including minimizing Lx(x, uV) over u;
computing y=g(u*W), where g is a link function corresponding to a loss Ly(Y, UW); and
returning a prediction y, for the input data for at least one of the end-to-end connectivity in a wired and wireless sensor network, the customer response to advertisement, and the functional magnetic resonance imaging (fMRI) data analysis, the input data.

* * * * *